(12) United States Patent
Li

(10) Patent No.: US 6,292,048 B1
(45) Date of Patent: Sep. 18, 2001

(54) GATE ENHANCEMENT CHARGE PUMP FOR LOW VOLTAGE POWER SUPPLY

(75) Inventor: Bo Li, Sacramento, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/438,186

(22) Filed: Nov. 11, 1999

(51) Int. Cl.[7] .................................................. G05F 1/10
(52) U.S. Cl. ............................................ 327/536; 327/589
(58) Field of Search .................................. 327/536, 537, 327/589; 363/60

(56) References Cited

U.S. PATENT DOCUMENTS

| | | | |
|---|---|---|---|
| 5,140,182 | * 8/1992 | Ichimura | 327/536 |
| 5,301,097 | 4/1994 | McDaniel | 363/60 |
| 5,414,669 | 5/1995 | Tedrow et al. | 365/226 |
| 5,422,586 | 6/1995 | Tedrow et al. | 327/306 |
| 5,426,391 | 6/1995 | Tedrow et al. | 327/530 |
| 5,430,402 | 7/1995 | Tedrow et al. | 327/530 |
| 5,446,408 | 8/1995 | Tedrow et al. | 327/530 |
| 5,483,486 | 1/1996 | Javanifard et al. | 365/185.17 |
| 5,821,805 | * 10/1998 | Jinbo | 327/537 |
| 5,841,703 | 11/1998 | Wojciechowski | 365/189.09 |
| 6,023,188 | * 2/2000 | Lee et al. | 327/536 |

\* cited by examiner

*Primary Examiner*—Jung Ho Kim
(74) *Attorney, Agent, or Firm*—Blakely, Sokoloff, Taylor & Zafman LLP (57) ABSTRACT

A gate enhancement charge pump for a low voltage power supply. The charge pump stage circuit comprises a first transistor comprising a first terminal, a second terminal, and a third terminal. The stage further comprises a first capacitor comprising a first terminal coupled to a first clock source and a second terminal coupled to said third terminal of said first transistor. The circuit also comprises a second capacitor comprising a first terminal coupled to a second clock source and a second terminal coupled to said second terminal of said first transistor. The circuit further comprises a first diode comprising an input terminal coupled to said first terminal of said first transistor and an output terminal coupled to said second terminal of said first transistor. The circuit also comprises a second diode comprising a control terminal coupled to a control device, an input terminal coupled to said second terminal of said first transistor, and an output terminal coupled to said first terminal of said first transistor.

41 Claims, 7 Drawing Sheets

GATE ENHANCEMENT CHARGE PUMP FOR LOW VOLTAGE POWER SUPPLY

FIELD OF THE INVENTION

The present invention relates generally to the field of computers and computer systems. More particularly, the present invention relates to a gate enhancement charge pump for a low voltage power supply.

BACKGROUND OF THE INVENTION

Many of today's computing applications such as cellular phones, digital cameras, and personal computers, use nonvolatile memories to store data or code. Nonvolatility is advantageous because it allows the computing system to retain its data and code even when power is removed from the computing system. Thus if the system is turned off or if there is a power failure, there is no loss of code or data.

One example of a nonvolatile memory device is the flash Electrically Erasable Programmable Read-only Memory (flash EEPROM or flash memory). Flash memory can be programmed by the user, and once programmed, the flash memory retains its data until the memory is erased. Electrical erasure of the flash memory erases the contents of the memory of the device in one relatively rapid operation. The flash memory may then be programmed with new code or data.

Flash memories have been used in portable computers and similar circuitry as both read only memory and as long term storage which may be both read and written. However, the tendency has been to reduce the power requirements of such portable computers to make systems lighter and to increase the length of use between recharging. This has required that the voltage potentials available to program the flash memory arrays be reduced. Flash memories must be able to operate in systems where a VCC supply voltage of 5V, 3V, or an even smaller voltage is available to circuit components. However, performing program and erase operations in flash memory components requires that greater voltage than that supplied to the component be applied to the flash memory cells. For example, a program operation may require that approximately 10.5V be applied to a memory cell. In order to achieve this voltage, a charge pump circuit is required in the flash memory component. A positive charge pump can take a supplied VCC voltage and create a voltage sufficient for program operations. The charge pump must also be able to deliver sufficient current at the required voltage levels.

Figure 1:
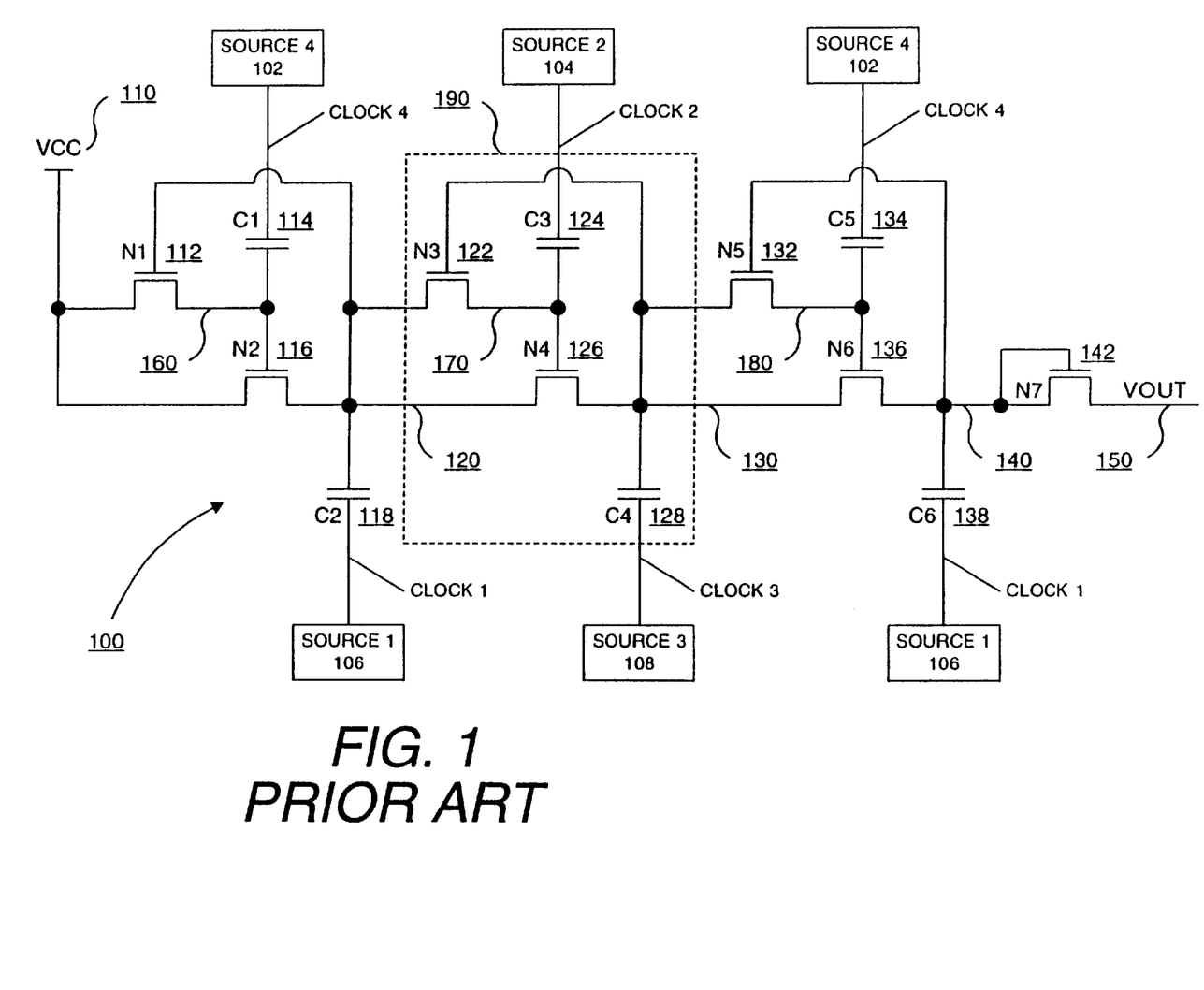
FIG. 1 is a typical implementation of a prior art charge pump.

FIG. 1 is a typical implementation of a prior positive charge pump 100. The charge pump 100 of FIG. 1 is comprised of three pump stages. A number of N type field effect transistors N2 116, N4 126, N6 136, N7 142 are coupled in series between a VCC supply source 110 and a pump output terminal VOUT 150. Each stage of the pump 100 includes an N type device N1 112, N3 122, N5 132 to control the voltage potential at the gate terminal of the coupling transistor N2 116, N4 126, N6 136 of that respective stage. Each stage also includes a pump capacitor C1 114, C3 124, C5 134 and a boot capacitor C2 118, C4 128, C6 138. Clock signals 1 and 3 are supplied to the circuit 100 from source 1 106 and source 3 108, respectively, via capacitors C2 118, C4 128, C6 138. Clock signals 2 and 4 are supplied from source 2 104 and source 4 102, respectively, via capacitors C1 114, C3 124, C5 134.

Figure 2:
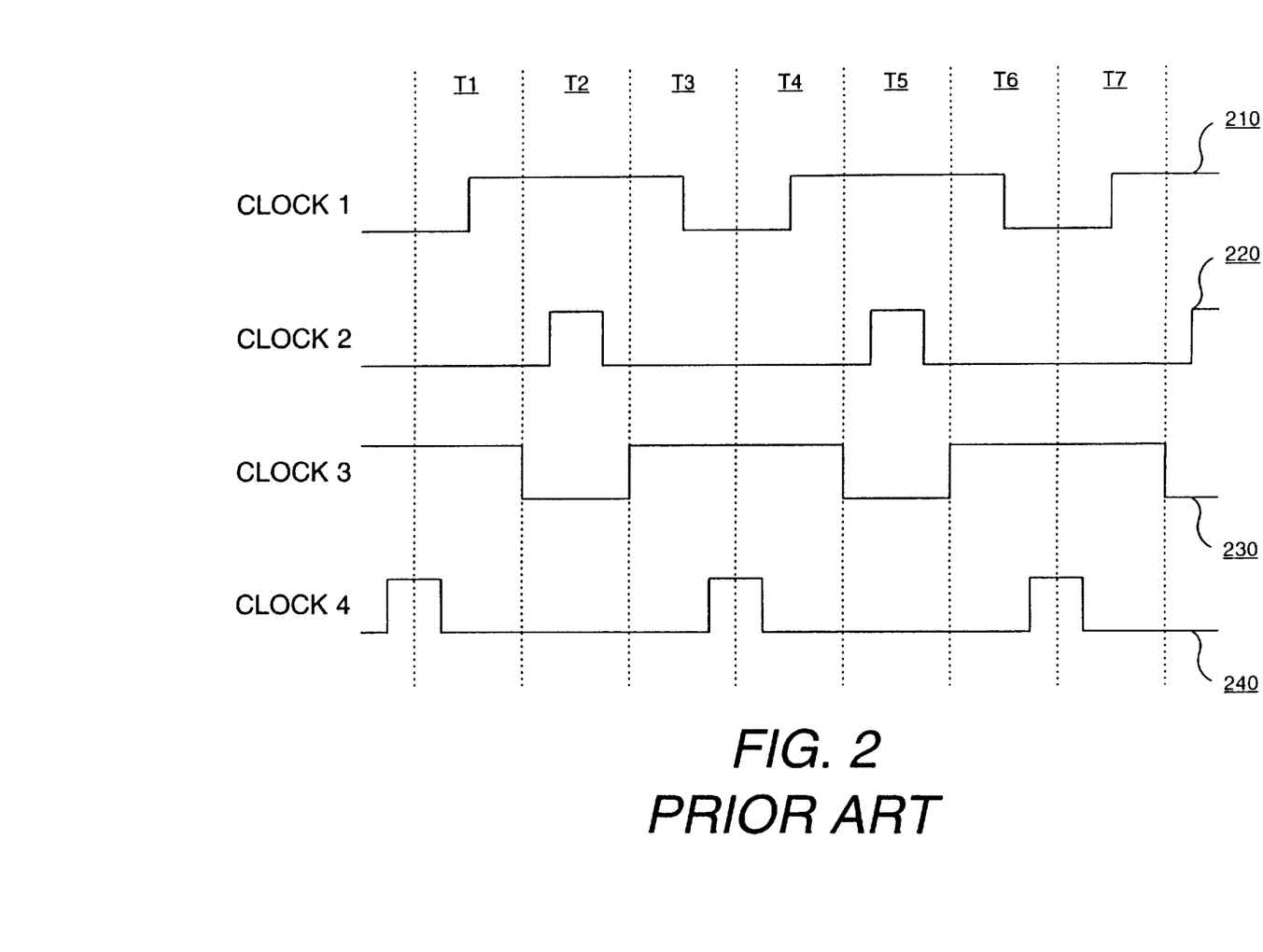
FIG. 2 shows a timing diagram of clock signals used in connection with the prior art charge pump circuit of FIG. 1.

FIG. 2 shows a timing diagram of clock signals used in connection with the prior art charge pump circuit of FIG. 1. In order to understand the operation of the circuit 100, the operation of a single stage 190 including the switching transistor N4 126 will be discussed. FIG. 2 shows the clock signals referred to as CLOCK 1 210, CLOCK 2 220, CLOCK 3 230, and CLOCK 4 240 associated with the circuit 100. Following the prior art timing diagram of FIG. 2, CLOCK 3 230 and CLOCK 4 240 are initially at a logic high level. Because CLOCK 3 230 is high, the pre-charge device N3 122 is initially on. When CLOCK 1 210 signal transitions to a logic high during time T1, the voltage pulse applied through C2 118 charges C3 124 on node 170 at the gate terminal of N4 126 through N3 122. C3 124 is charged to the voltage level of the gate terminal of device N3 122 minus a threshold voltage drop. When CLOCK 3 230 transitions to a logic low, N3 122 turns off, isolating the gate of N4 126 and leaving C3 124 charged. This also lowers the voltage at the source terminal of N4 126 at node 130 such that N4 126 begins to conduct. When CLOCK 2 220 transitions to a logic high, the voltage at the gate of N4 126 is appreciably higher than at its drain terminal at node 120 because of the pre-charging of C3 124. Hence N4 126 is turned on in the operating region where the device experiences no threshold voltage drop. The elimination of the threshold voltage drop means that the circuit 100 can provide increased current from C2 118 to the next stage. The high voltage at C2 118 begins to charge capacitor C4 128 and to discharge capacitor C5 134 through N5 132.

As CLOCK 2 220 transitions low, N4 126 begins to turn off. When CLOCK 3 230 transitions high, N3 122 turns on to discharge the gate terminal of N4 126 and brings node 170 toward the voltage of the drain terminal so that N4 126 turns off. When CLOCK 1 210 goes low, N4 126 stays off and N3 122 stays on such that the charge at the drain and gate terminals of N4 126 are equalized.

Viewing the circuit 100 as a whole, when the device N2 116 comes on in response to a high CLOCK 4 240, its gate terminal has been charged through N1 112. Thus, N2 116 turns on without a threshold voltage drop and charges C2 118 rapidly. N2 116 begins to turns off as CLOCK 4 240 goes low. The rising CLOCK 1 210 pulse completes the turnoff of N2 116 by discharging C1 114 through N1 112. The high CLOCK 1 210 continues the charging of C3 124 until the drop of CLOCK 3 230. A low CLOCK 3 230 turns off N3 122, leaving the gate terminal of N4 126 charged. The lowering of CLOCK 3 230 begins turning on N4 126, which comes on completely without a threshold voltage drop when CLOCK 2 220 goes high and the voltage potential at the gate terminal of N4 126 rises above the potential at the drain terminal. This allows the charging of C4 128. The same sequence continues through whatever number of stages are present in the pump 100 until the charge on the capacitor C6 138 of the final stage is sufficient to turn on N7 142 to provide a pumped voltage level at the output VOUT 150. The last stage of the pump 100 operates in a range in which it experiences a threshold voltage drop.

In addition to experiencing a threshold voltage drop in the last stage, prior pump circuits such as that discussed above have the disadvantage of being unable to provide adequate current when required to operate with supply voltages below approximately 3V. For example, the pump circuit 100 discussed above would be unable to produce adequate current when supplied with 1.8V and pumping up to a voltage of 10.5V. An analogous situation exists with prior negative charge pumps, where a negative pump may need to pump to a voltage of approximately −12.5 when a supply voltage of 1.8V is supplied.

SUMMARY OF THE INVENTION

A gate enhancement charge pump for a low voltage power supply is described. The charge pump stage circuit comprises a first transistor comprising a first terminal, a second terminal, and a third terminal. The stage further comprises a first capacitor comprising a first terminal coupled to a first clock source and a second terminal coupled to said third terminal of said first transistor. The circuit also comprises a second capacitor comprising a first terminal coupled to a second clock source and a second terminal coupled to said second terminal of said first transistor. The circuit further comprises a first diode comprising an input terminal coupled to said first terminal of said first transistor and an output terminal coupled to said second terminal of said first transistor. The circuit also comprises a second diode comprising a control terminal coupled to a control device, an input terminal coupled to said second terminal of said first transistor, and an output terminal coupled to said first terminal of said first transistor.

Other features and advantages of the present invention will be apparent from the accompanying drawings and from the detailed description that follow below.

BRIEF DESCRIPTION OF THE DRAWINGS

The present invention is illustrated by way of example and not limitations in the figures of the accompanying drawings, in which like references indicate similar elements, and in which.

DETAILED DESCRIPTION

A gate enhancement charge pump for a low voltage power supply is disclosed. The described gate enhancement charge pump is used as a power supply in nonvolatile writable memory, but is not so limited. Although the following embodiments are described with reference to nonvolatile writable memories and flash memory, other embodiments are applicable to other low power circuits or voltage supplies. The same techniques and teachings of the present invention can easily be applied to other types of circuits or semiconductor devices that use charge pumps.

One embodiment of a positive charge pump stage provides a charge pump stage circuit with diode connected pull-up and pull-down on a boot node. The pull-up includes a diode connected transistor which serves to pre-charge the gate of a switching transistor. The pre-charging of the switching transistor allows the transistor to operate in a region that allows voltage transfer from the current stage to the next stage without a threshold voltage drop across the switching transistor. The pull-down includes a transistor that ensures that the switching transistor will turn off once the voltage transfer has occurred, thereby preventing current from flowing from the next stage back to the current stage.

In one existing charge pump scheme, the pull-down is gradually turned on as charge is transferred from one side of the charge passing device to the other. The charge passing device or switching transistor cannot maintain its gate terminal voltage level when the pull-down device is on and efficiency is decreased. As a result, insufficient charge transfer through the charge passing device may result.

One embodiment includes a control device between the gate and drain terminals of the pull-down to switch the pull-down on and off. The control device controls whether the pull-down is diode-connected or not during the pump operation.

Embodiments of the present invention can facilitate a reduction in die area utilization. This reduction is made possible by an increase in current production. Other embodiments may provide an increase in clock frequency such that overall pump performance is improved. The pull-up and pull-down diode-connected transistors and control device may also be used in negative charge pumps in an analogous manner.

Figure 3:
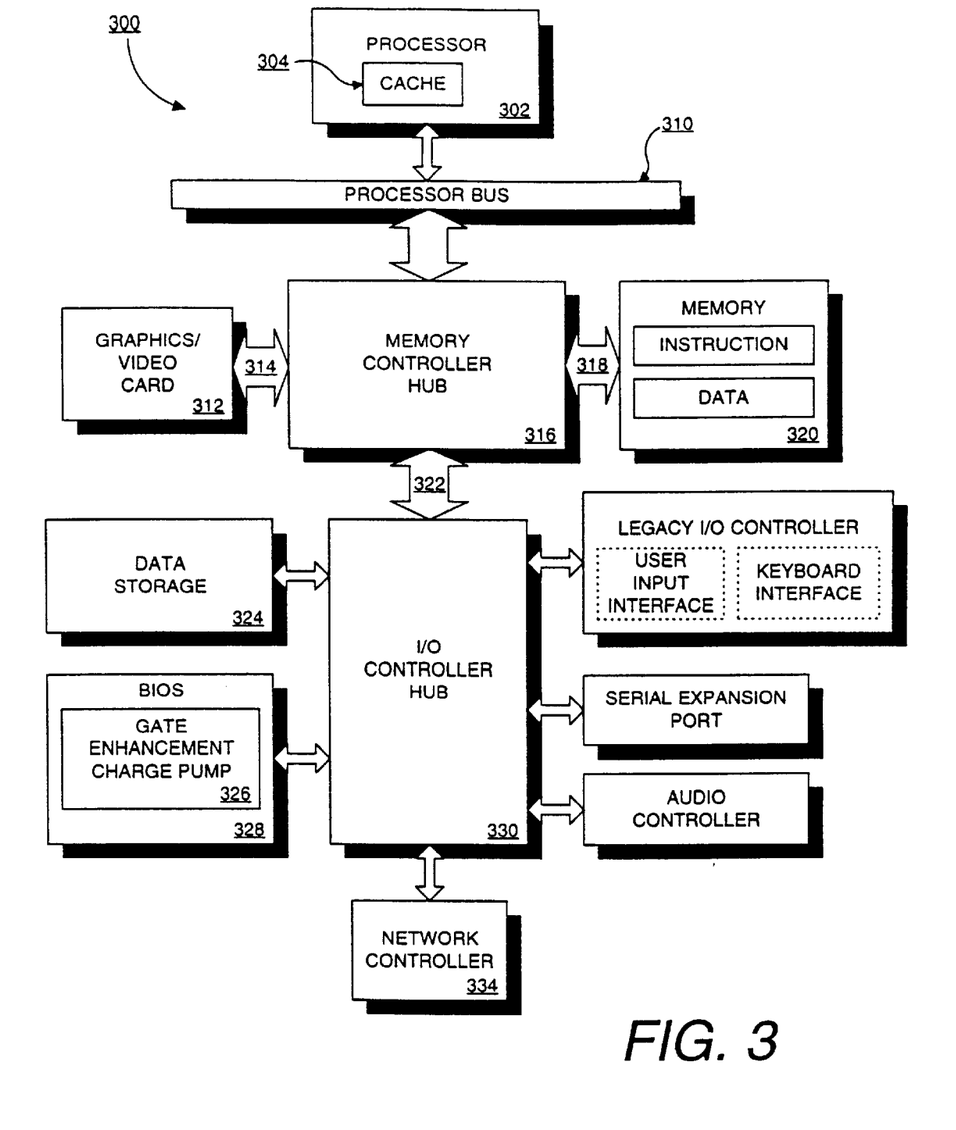
FIG. 3 is a computer system utilizing a gate enhancement charge pump.

Referring now to FIG. 3, there is a computer system 300 that includes the present embodiment. Sample system 300 uses a memory that incorporates a gate enhancement charge pump such as that of one embodiment described herein. Sample system 300 is representative of processing systems based on the PENTIUM®, PENTIUM® Pro, PENTIUM® II, PENTIUM® III microprocessors available from Intel Corporation of Santa Clara, Calif., although other systems (including PCs having other microprocessors, engineering workstations, set-top boxes and the like) may also be used. Thus, the present invention is not limited to any specific combination of hardware circuitry and software.

The present invention is not limited to computer systems. Alternative embodiments of the present invention can be used in other types of devices such as handheld devices and embedded applications. Some examples of handheld devices include cellular phones, Internet Protocol devices, digital cameras, personal digital assistants (PDAs), and handheld PCs. Embedded applications can include a microcontroller, a digital signal processor (DSP), system on a chip, network computers (NetPC), set-top boxes, network hubs, wide area network (WAN) switches, or any other system which uses flash memory for other embodiments.

FIG. 3 is a block diagram of a system 300 of one embodiment. The computer system 300 includes a processor 302 that processes data signals. FIG. 3 shows an example of an embodiment of the present invention implemented in a single processor system 300. However, it is understood that other embodiments may alternatively be implemented as systems having multiple processors. Processor 302 is coupled to a processor bus 310 that transmits data signals between processor 302 and other components in the system 300. The elements of system 300 perform their conventional functions well known in the art.

System 300 includes a memory 320. Memory 320 may be a dynamic random access memory (DRAM) device, a static random access memory (SRAM) device, flash memory device, or other memory device. A cache memory 304 can reside inside processor 302 that stores data signals stored in memory 320. Alternatively, in another embodiment, the cache memory may reside external to the processor.

A system logic chip 316 is coupled to the processor bus 310 and memory 320. The processor 302 communicates to a memory controller hub (MCH) 316 via a processor bus 310. The MCH 316 provides a high bandwidth memory path 318 to memory 320 for instruction and data storage and for storage of graphics commands, data and textures. The MCH 316 directs data signals between processor 302, memory 320, and other components in the system 300 and bridges the data signals between processor bus 310, memory 320, and system I/O 322. The graphics card 312 is coupled to the MCH 316 through an Accelerated Graphics Port (AGP) interconnect 314.

System 300 uses a proprietary hub interface bus 322 to couple the MCH 316 to the I/O controller hub (ICH) 330. The ICH 330 provides direct connections to some I/O devices. Some examples are the audio controller, BIOS 328, data storage 324, legacy I/O controller containing user input and keyboard interfaces, a serial expansion port such as Universal Serial Bus (USB), and a network controller 334. The data storage device 324 can comprise a hard disk drive, a floppy disk drive, a CD-ROM device, a flash memory device, or other mass storage device. A gate enhancement charge pump 326 resides in the flash memory BIOS 328 in this embodiment. In an alternative embodiment, the BIOS 328 may be part of a firmware hub.

For another embodiment of a system, one implementation of a charge pump can be used with a system on a chip. One embodiment of a system on a chip comprises of a processor and a memory. The memory for one system is a flash memory. The flash memory can be located on the same die as the processor and other system components. Additionally, other logic blocks such as a memory controller or graphics controller can also be located on a system on a chip. By including one embodiment of the present invention on the system on a chip, the flash memory can be enabled to program and erase flash memory cells without requiring a high voltage pin on the system on a chip pin-out. The needed high voltage potentials can be generated on the same die.

Figure 4:
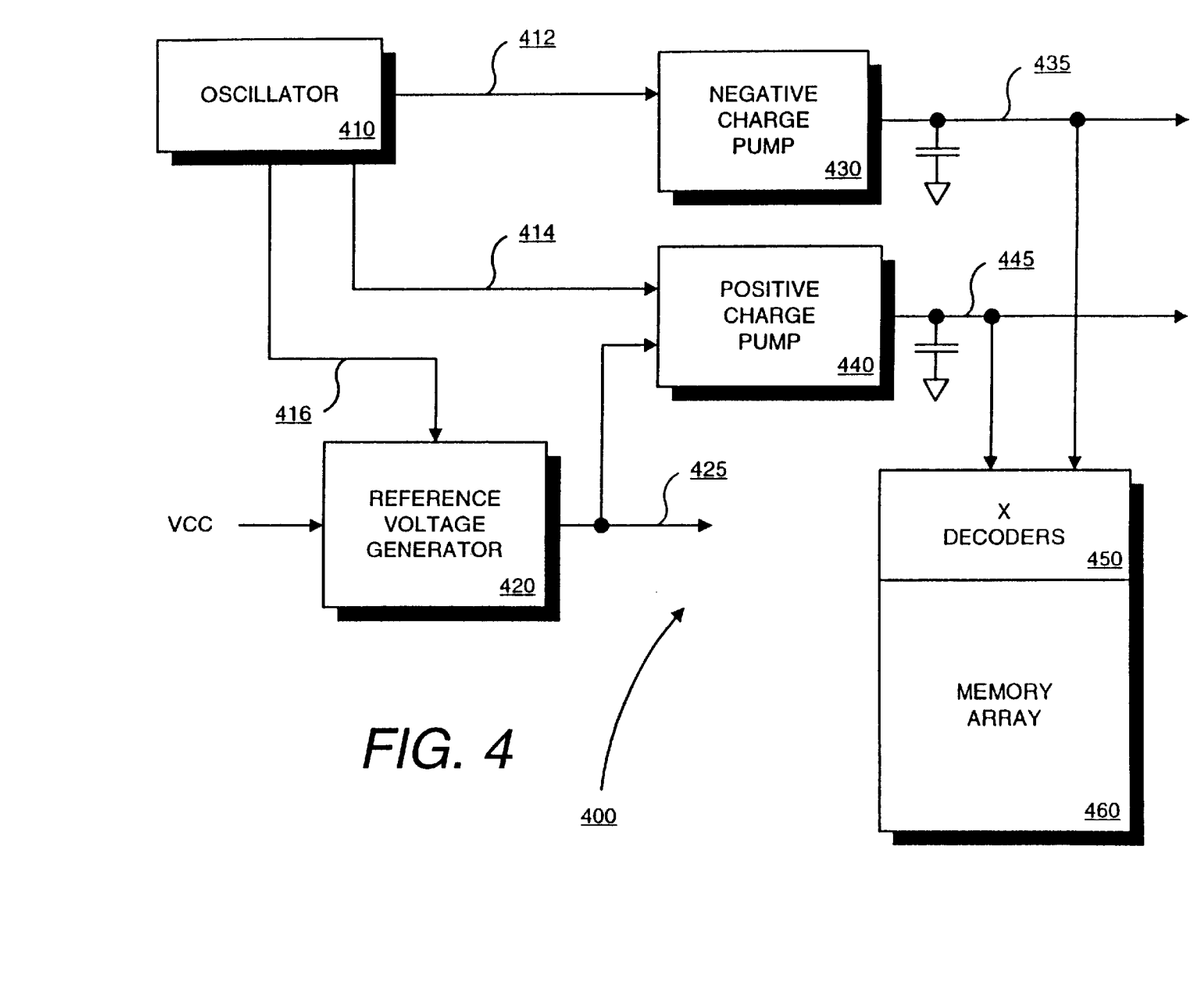
FIG. 4 is a flash memory circuit using a gate enhancement charge pump of one embodiment.

FIG. 4 is a flash memory circuit 400 using a gate enhancement charge pump of one embodiment. Reference generator 420 provides a reference voltage 425 to the positive pump 440. For one embodiment, the positive charge pump 440 is a gate enhancement charge pump. The positive pump 440 provides a regulated voltage of approximately five volts over decode supply line 445 to the X-decoders 450 of the memory array 460. The negative pump provides a voltage of approximately negative five volts over decoder supply line 435 to the X-decoders of memory array 460. The oscillator 410 provides clock signals 412, 414, 416 that periodically pulse or enable the negative pump 430, the positive pump 440, and the reference generator 420, respectively, when they are in a standby mode. The clock signals 412, 414, 416 may each have a different frequency.

Figure 5:
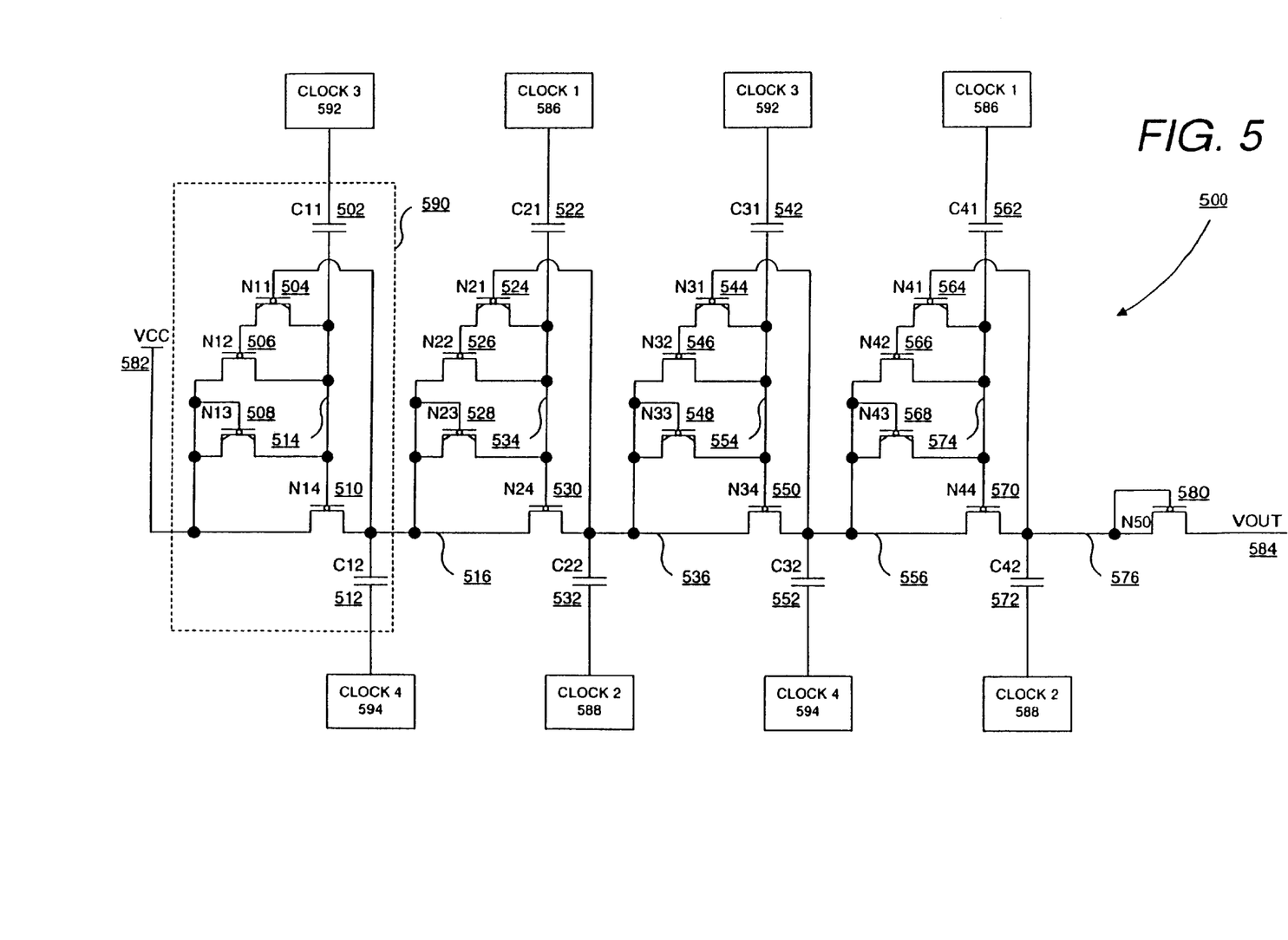
FIG. 5 is a circuit diagram of a gate enhancement charge pump of one embodiment.

FIG. 5 is a circuit diagram of a gate enhancement charge pump 500 of one embodiment. The four state positive charge pump 500 of this embodiment comprises of four pump stages. The embodiment of FIG. 5 includes switching transistors N14 510, N24 530, N34 550, N44 570 connected in series between VCC 582 and VOUT 584. The switching transistors N14 510, N24 530, N34 550, N44 570 are preferably S type field effect transistors.

S devices are also known as low threshold voltage (Vt) N type field effect transistors. Similarly, S' devices are also low Vt N type field transistors, but S' devices have a threshold voltage lower than that of a S type device. Although S and S' type field effect transistors are described in the present embodiment of the invention, N type and/or N' type transistors may also be used in alternative embodiments.

The embodiment of FIG. 5 further includes pull-up transistors N13 508, N23 528, N33 548, N43 568. The pull-up transistors N13 508, N23 528, N33 548, N43 568 are S' type field effect transistors in this embodiment. The source terminals of pull-up transistors N13 508, N23 528, N33 548, N43 568 are connected to the gate terminals of switching transistors N14 510, N24 530, N34 550, N44 570, respectively. The pull-up transistors N13 508, N23 528, N33 548, N43 568 are diode connected, with the drain terminal and the gate terminal of each pull-up transistor N13 508, N23 528, N33 548, N43 568 connected to the drain terminal of the respective switching transistor N14 510, N24 530, N34 550, N44 570.

The embodiment of FIG. 5 further includes pull-down transistors N12 506, N22 526, N32 546, N42 566. The pull-down transistors N12 506, N22 526, N32 546, N42 566 of this embodiment are S type field effect transistors. The drain terminals of the pull-down transistors N12 506, N22 526, N32 546, N42 566 are connected to the gate terminals of the switching transistors N14 510, N24 530, N34 550, N44 570, respectively. The source terminals of the pull-down transistors N12 506, N22 526, N32 546, N42 566 are connected to the drain terminals of the switching transistors N14 510, N24 530, N34 550, N44 570, respectively. The gate terminal of the pull-down transistor N12 506, N22 526, N32 546, N42 566 is connected to the source terminal of control device N11 504, N21 524, N31 544, N41 564, respectively.

Some existing charge pumps, such as a charge pump apparatus with diode connected pull-up on boot nodes, have pull-down devices whose gates are connected to the same boot node. In an existing pump scheme, the charge passing device or switching transistor cannot maintain its gate terminal voltage level when its drain terminal voltage drops down during charge transfer. The pull-down diode is gradually turned on in the process. This causes insufficient charge transfer for pump stages that have relatively low threshold voltage switching transistors. One solution is to turn off the pull-down transistor or pull-down diode during charge transfer so that the gate voltage of the switching transistor can be maintained.

For this embodiment of the present invention, a control device serves as a switch between the gate and drain terminals of the pull-down transistor. The control device switches the pull-down transistor from being diode connected or not. Control devices N11 504, N21 524, N31 544, N41 564 are S' field effect transistors in this embodiment. The drain terminals of control devices N11 504, N21 524, N31 544, N41 564 are connected to the gate terminals of switching transistors N11 504, N21 524, N31 544, N41 564, respectively. The gate terminals of control devices N11 504, N21 524, N31 544, N41 564 are connected to the source terminals of switching transistors N14 510, N24 530, N34 550, N44 570, respectively.

Control devices N11 504, N21 524, N31 544, N41 564 separate the boot node 514, 534, 554, 574 from the diode connected pull-down device N12 506, N22 526, N32 546, N42 566 respectively. The gates of the S' devices N11 504, N21 524, N31 544, N41 564 connect to the next higher pump node 516, 536, 556, 576, respectively, and stops the formerly diode connected N12 506, N22 526, N32 546, N42 566 from discharging the boot node 514, 534, 554, 574 while the node is being booted by CLOCK 3 592 or CLOCK 1 586, respectively. By controlling the discharge of boot node 514, 534, 554, 574 through the pull-down device N12 506, N22 526, N32 546, N42 566, respectively, more gate drive is available to the charge transfer device N14 510, N24 530, N34 550, N44 570. Thus more charge can be passed from one pump stage to the next high pump stage.

Also included in the embodiment of FIG. 5 are storage capacitors C12 512, C22 532, C32 552, C42 572. Storage capacitor C12 512 is connected between a CLOCK 4 594 signal and the source terminal of switching transistor N14 510. Storage capacitor C22 532 is connected between a CLOCK 2 588 signal and the source terminal of the switching transistor N24 530. Storage capacitor C32 552 is connected between a CLOCK 4 594 signal and the source terminal of switching transistor N34 550. Storage capacitor C42 572 is connected between a CLOCK 2 588 signal and the source terminal of switching transistor N44 570.

The embodiment of FIG. 5 further includes boot node capacitors C11 502, C21 522, C31 542, C41 562. Boot node capacitor C11 502 is connected between a CLOCK 3 592 signal and the gate terminal of N14 510. Boot node capacitor C21 522 is connected between a CLOCK 1 586 signal and the gate of N24 530. Boot node capacitor C31 542 is connected between a CLOCK 3 592 signal and the gate of N34 550. Boot node capacitor C41 562 is connected between a CLOCK 1 586 signal and the gate of N44 570. For this embodiment, the clock signals 586, 588, 592, 594 are generated by a four phase clock driver which takes its input from an oscillator circuit as in FIG. 4.

Nodes 516, 536, 556, 576 are shown in FIG. 5. Node 516 is defined by the connection of storage capacitor C12 512, the source terminal of switching transistor N14 510, the gate terminal of control device N11 504, the drain terminal of switching transistor N24 530, the gate and drain terminals of pull-up transistor N23 528, and the source terminal of pull-down transistor N22 526. VCC 582 is connected to the drain terminal of N14 510, the gate and drain terminals of N13 508, and the source terminal of N12 506. Node 536 is defined by the connection of C22 532, the source terminal of N24 530, the gate terminal of N21 524, the drain terminal of N34 550, the gate and drain terminals of N33 548, and the source terminal of N32 546. Node 556 is defined by the connection of C32 552, the source terminal of N34 550, the gate terminal of N31 544, the drain terminal of N44 570, the gate and drain terminals of N43 568, and the source terminal of N42 566. Node 576 is defined by the connection of C42 572, the gate terminal of N41 564, and the gate and drain terminals of N50 580.

Boot nodes 514, 534, 554, 574 are also shown in FIG. 5. Boot node 514 is defined by the connection of the boot capacitor C11 502, the gate terminal of switching transistor N14 510, the source terminal of pull-up transistor N13 508, the drain terminal of pull-down transistor N12 506, and the drain terminal of control device N11 504. Boot node 534 is defined by the connection of C21 522, the gate terminal of N24 530, the source terminal of N23 528, the drain terminal of N22 526, and the drain terminal of N21 524. Boot node 554 is defined by the connection of C31 542, the gate terminal of N34 550, the source terminal of N33 548, the drain terminal of N32 546, and the drain terminal of N31 544. Boot node 574 is defined by the connection of C41 562, the gate terminal of N44 570, the source terminal of N43 568, the drain terminal of N42 566, and the drain terminal of N41 564.

The embodiment of FIG. 5 includes four positive charge pump stages. One of these stages is labeled as stage 590, and includes the storage capacitor C12 512, the switching transistor N14 510, the pull-up transistor N13 508, the pull-down transistor N12 506, the control device N11 504, and the boot node capacitor C11 502. Stage 590 receives its input from a VCC supply source 582. The output of this charge pump embodiment is labeled as VOUT 584. The last stage of the charge pump 500 is coupled to the pump output VOUT 584 through a diode connected transistor N50 580.

Although the positive charge pump embodiment of FIG. 5 includes four stages, other numbers of stages are possible. Furthermore, the same techniques and teachings of the present invention can be applied to negative charge pumps and other applications wherein a positive or negative voltage potential greater than that of a supply voltage is needed to be generated internally. The present invention can be used in a variety of charge pumps to improve the output current and pumping efficiency. The increased output and efficiency may also lead to die size savings if the size of the charge pumps can be reduced as a result.

Figure 6:
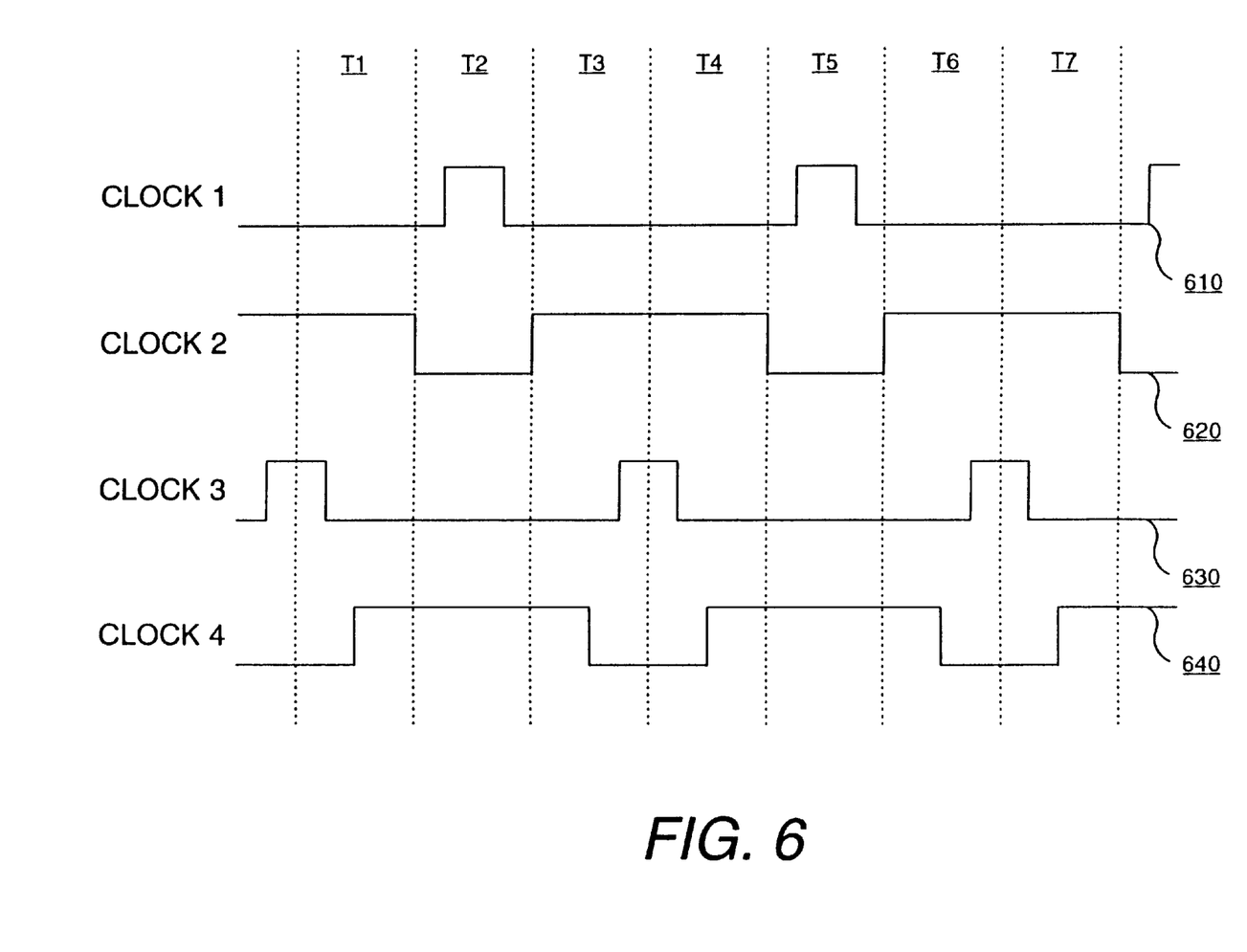
FIG. 6 shows a timing diagram of the pump clocking waveforms used in connection with the positive charge pump of FIG. 5.

FIG. 6 shows a timing diagram of the pump clocking waveforms used in connection with the positive charge pump 500 of FIG. 5. The clock signals CLOCK 1 610, CLOCK 2 620, CLOCK 3 630, CLOCK 4 640 control the operation of this embodiment of a positive charge pump 500. For this embodiment, all of the clock signals 610, 620, 630, 640 are at VCC level when high and at ground potential when low. VCC level varies depending on the particular embodiment and could possibly be 3V, 1.8V, or 1.55V.

The pumping operation can be abbreviated as the following steps and the repeat of those steps to generate currents. The following discussion will concentrate on the operation of pump 500 beginning with the first low-to-high transition of CLOCK 4 640 at time T1. When CLOCK 4 640 is high, the potential at node 516 is boosted high. The high potential at node 516 pre-charges the boot node 534 of the second stage through N23 528 and turns on N11 504. Boot node 534 is charged to a voltage potential of one threshold voltage less than the voltage on node 516. Because of the voltage on boot node 534, switching transistor N24 530 is nearly turned on. As N11 504 turns on, N12 506 is activated to discharge boot node 514 of the first stage 590. Discharging boot node 514 prevents back conductance through N14 510. When CLOCK 2 620 transitions low, the voltage potential at node 536 drops low to be ready to receive charge from C12 512 at node 516 and turns off N21 524. When CLOCK 1 610 transitions high, boot node 534 goes high and N24 530 gets turned on. Charge is transferred from C12 512 at node 516 through N24 530 to C22 532 at node 536. The voltage potential at node 516 decreases while the potential at node 536 increases. As CLOCK 1 610 transitions back to a logic low, the charge transfer from node 516 to node 536 stops and the voltage level on the nodes level out.

When CLOCK 2 620 goes high, the voltage potential at node 536 also goes high. C31 542 on boot node 554 is pre-charged by C22 532 through N33 548. The high potential on node 536 also turns on N21 524, which activates N22 526 to discharge boot node 534. Discharging boot node 534 turns off N24 530 to prevent back conductance from node 536 to node 516. when the voltage on node 536 is greater than the voltage on node 516. When CLOCK 4 640 transitions low at time T3, the voltage potential on C32 552 at node 556 drops low in order to be ready to receive charge from C22 532 at node 536. A low on CLOCK 4 640 also turns off N31 544.

As CLOCK 3 630 transitions high during time T3, boot node 554 of the third stage also goes high. A high CLOCK 3 630 turns on switching transistor N34 550. Charge is transferred from C22 532 through N34 550 to C32 552, causing the voltage potential on node 536 to drop and the potential on node 556 to rise. When CLOCK 3 630 goes low during time T4, the charge transfer stops. The potentials on node 536 and node 556 level out. The cycle repeats with the low to high transition of CLOCK 4 640 at time T4.

The embodiment of FIG. 5 eliminates of the requirement of overlapping clock periods typically found with prior charge pump circuits. Overlapping clock periods are not required in the embodiment of FIG. 5 because the voltage on the boot nodes 514, 534, 554, 574 are dependent on the voltages on the nodes 582, 516, 536, 556, respectively, and not on the voltage present at the following stage, as is the case with prior pump circuits. The elimination of the overlapping clocks allows for an increase in clock frequency, which improves pump circuit performance.

Although the clocks signals 610, 620, 630, 640 of FIG. 6 are shown to overlap, in other words no two clock edges are shown to occur simultaneously, there is no requirement for the clocks to overlap. Clock edges may occur nearly simultaneously, although a small overlap, preferably approximately 2 nanoseconds for one embodiment, may be used in order to account for the non-vertical nature of clock edges.

Figure 7:
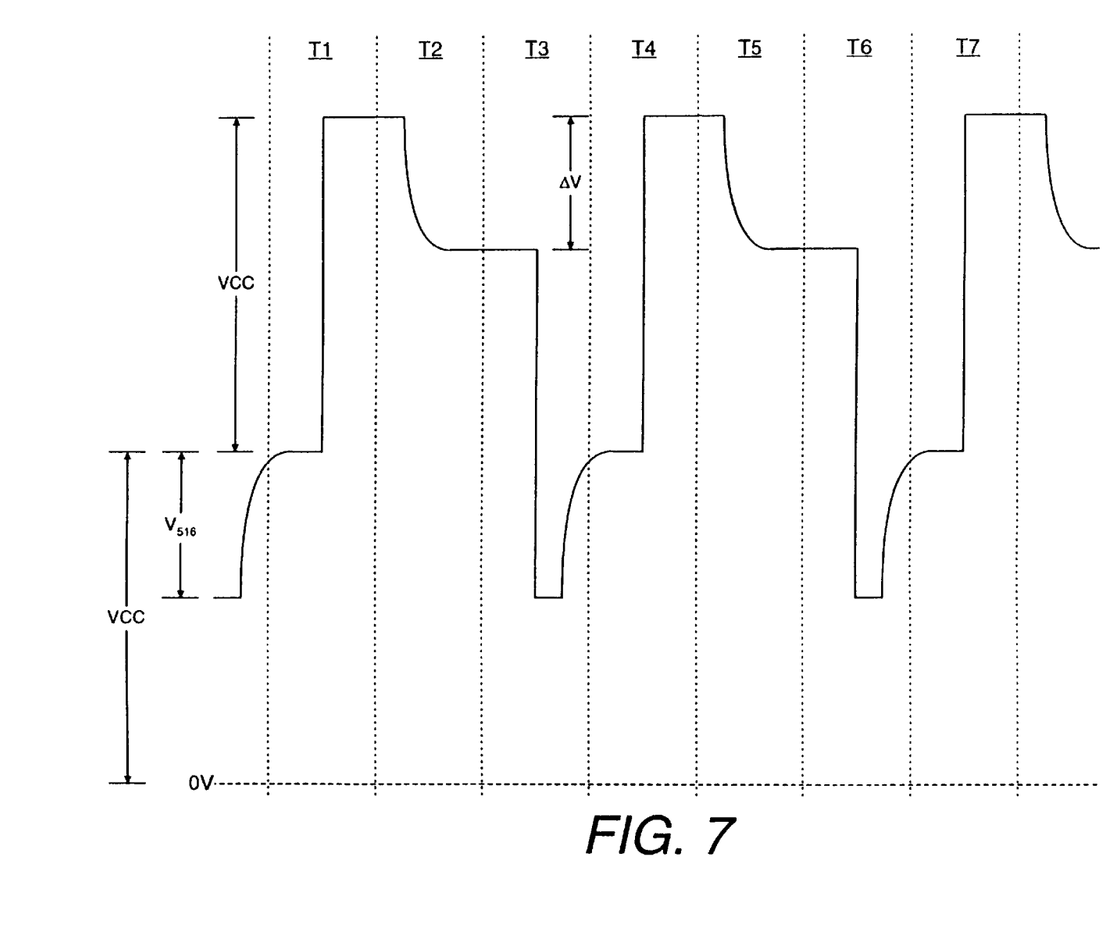
FIG. 7 is a plot of the output of one stage of the charge pump embodiment of FIG. 5.

FIG. 7 is a plot of the voltage potential of outputted from the first stage 590 of charge pump 500 of FIG. 5. The plot indicates the voltage potential at node 516 during the operation of the pump 500. The resulting output waveform from node 516 corresponds to the operation of pump 500 with the clock signals 610, 620, 630, 640 of FIG. 6. The voltage ramp labeled $V_{516}$ indicates the potential transferred from VCC 582 to node 516 when N14 510 is turned on by a high CLOCK 3 592. Note that when CLOCK 3 592 is high, node 516 is charged up to a VCC level. As CLOCK 4 594 goes high, node 516 is boosted from a VCC to 2VCC. When CLOCK 1 586 goes high, N24 530 turns on to transfer charge from node 516 to node 536. The voltage drop labeled by $\Delta V$ indicates the amount of potential that is transferred from the first stage 590 to the second stage. As CLOCK 4 594 goes low, node 516 is no longer boosted and the potential drops back to a low value. The cycle then repeats.

In the foregoing specification, the invention has been described with reference to specific exemplary embodiments thereof. It will, however, be evident that various modifications and changes may be made thereof without departing from the broader spirit and scope of the invention as set forth in the appended claims. The specification and drawings are, accordingly, to be regarded in an illustrative rather than a restrictive sense.

What is claimed is:

1. A charge pump stage circuit comprising:
   a first transistor comprising a first terminal, a second terminal, and a third terminal;
   a first capacitor comprising a first terminal coupled to a first clock source and a second terminal coupled to said third terminal of said first transistor;
   a second capacitor comprising a first terminal coupled to a second clock source and a second terminal coupled to said second terminal of said first transistor;
   a first diode comprising an input terminal coupled to said first terminal of said first transistor and an output terminal coupled to said second terminal of said first transistor; and
   a second diode comprising a control terminal coupled to a control device, an input terminal coupled to said second terminal of said first transistor, and an output terminal coupled to said first terminal of said first transistor;
   wherein said control device is a second transistor comprising a first terminal coupled to said second terminal of said first transistor, a second terminal coupled to said third terminal of said first transistor, and a third terminal coupled to said control terminal of said second diode, said control device controlling operation of said second diode.

2. The circuit of claim 1 wherein said first transistor is a low threshold voltage N type field effect transistor.

3. The circuit of claim 1 wherein said first diode is a third transistor comprising first and second terminals coupled together to form said input terminal of said diode, and a third terminal of said third transistor to form said output terminal of said first diode.

4. The circuit of claim 3 wherein said third transistor is a low threshold voltage N type field effect transistor having a threshold voltage lower than that of said first transistor.

5. The circuit of claim 1 wherein said second diode is a fourth transistor comprising a first terminal to form said input terminal of said second diode, a second terminal to form said control terminal of said second diode, and a third terminal of said fourth transistor to form said output terminal of said second diode.

6. The circuit of claim 5 wherein said fourth transistor is an low threshold voltage N type field effect transistor.

7. The circuit of claim 5 wherein said second diode is formed when said control device is activated to electrically couple said first terminal of said fourth transistor to said second terminal of said fourth transistor.

8. The circuit of claim 1 wherein said second transistor is a low threshold voltage N field effect transistor having a threshold voltage lower than that of said first transistor.

9. The circuit of claim 1 wherein said first and second transistors and said first and second diodes are N type field effect transistors.

10. The circuit of claim 1 wherein said circuit is part of a positive charge pump.

11. The circuit of claim 1 wherein said circuit is part of a negative charge pump.

12. The circuit of claim 11 wherein said transistor and diodes comprise of P type field effect transistors.

13. The circuit of claim 1 wherein said first clock source asserts a first clock signal and said second clock source asserts a second clock signal, wherein said first and second clock signals are complementary without overlaps.

14. The circuit of claim 1 wherein said first and second clock source is an oscillator.

15. An apparatus comprising:
    a first transistor comprising a first terminal, a second terminal, and a third terminal;
    a first capacitor comprising a first terminal coupled to a first clock source and a second terminal coupled to said third terminal of said first transistor;
    a second capacitor comprising a first terminal coupled to a second clock source and a second terminal coupled to said second terminal of said first transistor;
    a second transistor comprising first and second terminals coupled to said first terminal of said first transistor and a third terminal coupled to said second terminal of said first transistor;
    a third transistor comprising a first terminal coupled to said second terminal of said first transistor, a second terminal coupled to a control device, and a third terminal coupled to said first terminal of said first transistor; and
    a control device controlling operation of said third transistor by electrically coupling said first and said second terminals of said third transistor together when said control device is activated.

16. The apparatus of claim 15 wherein said control device is a fourth transistor comprising a first terminal coupled to said second terminal of said second capacitor, a second terminal coupled to said second terminal of said first capacitor, and a third terminal coupled to said second terminal of said third transistor.

17. The apparatus of claim 15 wherein said control device activates said third transistor to discharge a node formed at said second terminal of said first transistor and said second terminal of said second capacitor.

18. The apparatus of claim 15 further comprising a clock signal generation circuit to provide a first clock signal to said first terminal of said first capacitor and a second clock signal to said first terminal of said second capacitor.

19. The apparatus of claim 15 wherein said first clock signal asserts a first clock signal and said second clock source asserts a second clock signal, wherein said first and second clock signals are complementary without overlaps.

20. The apparatus of claim 15 wherein said apparatus is a positive charge pump.

21. The apparatus of claim 15 wherein said first, second, and third transistors are N type field effect transistors.

22. The apparatus of claim 15 wherein said first and third transistors are low threshold voltage N type field effect transistors.

23. The apparatus of claim 15 wherein said second and fourth transistors are low threshold voltage N type field effect transistors having a threshold voltage lower than that of said first transistor.

24. The apparatus of claim 15 wherein said apparatus is a negative charge pump.

25. The apparatus of claim 15 wherein said first, second, and third transistors and said control device are P type field effect transistors.

26. An integrated circuit device comprising:
a charge pump of at least four stages wherein each stage comprises
  a first transistor comprising a first terminal, a second terminal, and a third terminal,
  a first capacitor comprising a first terminal and a second terminal, said second terminal coupled to said third terminal of said first transistor,
  a second capacitor comprising a first terminal and a second terminal, said second terminal coupled to said second terminal of said first transistor,
  a first diode comprising an input terminal coupled to said first terminal of said first transistor and an output terminal coupled to said second terminal of said first transistor, and
  a second diode comprising a control terminal coupled to a control device,
  an input terminal coupled to said second terminal of said first transistor, and
  an output terminal coupled to said first terminal of said first transistor;
    wherein said control device is a second transistor comprising a first terminal coupled to said second terminal of said first transistor, a second terminal coupled to said third terminal of said first transistor, and a third terminal coupled to said control terminal of said second diode, said control device controlling operation of said second diode; and
  said third terminal of said first transistor of said first stage coupled to said first terminal of said first transistor of said second stage, said third terminal of said first transistor of said second stage coupled to said first terminal of said first transistor of said third stage, and said third terminal of said first transistor of said third stage coupled to said first terminal of said first transistor of said fourth stage; and a clock generator for providing clock signals.

27. The integrated circuit device of claim 26 wherein said clock generator provides a first clock signal to said first terminal of said second capacitor of said second stage and to said first terminal of said second capacitor of said fourth stage, and provides a second clock signal to said first terminal of said first capacitor of said second stage and to said first terminal of said first capacitor of said fourth stage, and provides a third clock signal to said first terminal of said second capacitor of said first stage and to said first terminal of said second capacitor of said third stage, and provides a fourth clock signal to said first terminal of said first capacitor of said first stage and to said first terminal of said first capacitor of said third stage.

28. The integrated circuit device of claim 26 wherein said first diode is a third transistor comprising first and second terminals coupled together to form said input terminal of said diode and a third terminal of said third transistor to form said output terminal of said first diode.

29. The integrated circuit device of claim 26 wherein said second diode is a fourth transistor comprising a first terminal to form said input terminal of said second diode, a second terminal to form said control terminal of said second diode, and a third terminal of said fourth transistor to form said output terminal of said second diode.

30. The integrated circuit device of claim 29 wherein said second diode is formed when said control device is activated to electrically couple said first terminal of said fourth transistor to said second terminal of said fourth transistor.

31. The integrated circuit device of claim 26 wherein said charge pump is a positive charge pump.

32. The integrated circuit device of claim 26 wherein said first transistor, first and second diode, and control device are N type field effect transistors.

33. The integrated circuit device of claim 26 wherein said charge pump is a negative charge pump.

34. The integrated circuit device of claim 26 wherein said first transistor, first and second diode, and control device are P type field effect transistors.

35. The integrated circuit device of claim 26 wherein said integrated circuit device is a flash memory.

36. A system on a chip comprising:
a processor; and
a memory coupled to said processor, said memory comprising a memory array and a charge pump of at least four stages wherein each stage comprises
  a first transistor comprising a first terminal, a second terminal, and a third terminal,
  a first capacitor comprising a first terminal and a second terminal, said second terminal coupled to said third terminal of said first transistor,
  a second capacitor comprising a first terminal and a second terminal, said second terminal coupled to said second terminal of said first transistor,
  a first diode comprising an input terminal coupled to said first terminal of said first transistor and an output terminal coupled to said second terminal of said first transistor, and
  a second diode comprising a control terminal coupled to a control device, an input terminal coupled to said second terminal of said first transistor, and an output terminal coupled to said first terminal of said first transistor;
    wherein said control device is a second transistor comprising a first terminal coupled to said second terminal of said first transistor, a second terminal coupled to said third terminal of said first transistor, and a third terminal coupled to said control terminal of said second diode, said control device controlling operation of said second diode; and said third terminal of said first transistor of said first stage coupled to said first terminal of said first transistor of said second stage, said third terminal of said first transistor of said second stage coupled to said first terminal of said first transistor of said third stage, and said third terminal of said first transistor of said third stage coupled to said first terminal of said first transistor of said fourth stage; and a clock generator for providing clock signals.

37. The system of claim 36 wherein said first diode is a third transistor comprising first and second terminals coupled together to form said input terminal of said diode and a third terminal of said third transistor to form said output terminal of said first diode.

38. The system of claim 36 wherein said second diode is a fourth transistor comprising a first terminal to form said input terminal of said second diode, a second terminal to form said control terminal of said second diode, and a third terminal of said fourth transistor to form said output terminal of said second diode.

39. The system of claim 38 wherein said second diode is formed when said control device is activated to electrically couple said first terminal of said third transistor to said second terminal of said fourth transistor.

40. The system of claim 36 wherein said first transistor, first and second diode, and control device are N type field effect transistors.

41. The system of claim 36 wherein said first transistor, first and second diode, and control device are P type field effect transistors.

* * * * *